(12) United States Patent
Jiang

(10) Patent No.: US 11,464,089 B2
(45) Date of Patent: Oct. 4, 2022

(54) METHOD AND SYSTEM FOR DYNAMICALLY ADJUSTING PWM SIGNAL, AND SYSTEM FOR DYNAMICALLY CONTROLLING HIGH-POWER LIGHT

(71) Applicant: Guangzhou Haoyang Electronic Co., Ltd., Guangdong (CN)

(72) Inventor: Weikai Jiang, Guangdong (CN)

(73) Assignee: Guangzhou Haoyang Electronic Co., Ltd.

( * ) Notice: Subject to any disclaimer, the term of this patent is extended or adjusted under 35 U.S.C. 154(b) by 0 days.

(21) Appl. No.: 17/462,210

(22) Filed: Aug. 31, 2021

(65) Prior Publication Data
US 2022/0086982 A1    Mar. 17, 2022

Related U.S. Application Data

(63) Continuation of application No. PCT/CN2021/074042, filed on Jan. 28, 2021.

(30) Foreign Application Priority Data

Sep. 14, 2020    (CN) .......................... 202010962852.4

(51) Int. Cl.
H05B 45/325    (2020.01)

(52) U.S. Cl.
CPC .................................. *H05B 45/325* (2020.01)

(58) Field of Classification Search
CPC .. H05B 45/10; H05B 45/325; H05B 45/3725; H05B 47/10; H05B 47/125; H05B 47/155; H05B 47/17
See application file for complete search history.

(56) References Cited

U.S. PATENT DOCUMENTS

| 2010/0117549 A1 | 5/2010 | Barnhoefer et al. |
| 2015/0035441 A1* | 2/2015 | Hasegawa ............... H05B 45/46 315/178 |

(Continued)

FOREIGN PATENT DOCUMENTS

| CN | 102184709 A | 9/2011 |
| CN | 105430816 A | 3/2016 |

(Continued)

OTHER PUBLICATIONS

International Search Report for PCT/CN2021/074042 dated Jun. 4, 2021; 5 pages.

*Primary Examiner* — Thai Pham
(74) *Attorney, Agent, or Firm* — Lerner, David, Littenberg, Krumholz & Mentlik, LLP

(57) ABSTRACT

A method for dynamically adjusting a PWM signal includes steps of: presetting a standard signal period and a standard duty ratio of an effective pulse; receiving a target duty ratio entered by a user and comparing the target duty ratio with the standard duty ratio; adjusting a duration of a signal period relative to the standard signal period while keeping a duration of the effective pulse unchanged to cause a duty ratio to reach the target duty ratio, when the target duty ratio is smaller than the standard duty ratio; adjusting the duration of the effective pulse while keeping the duration of the standard signal period unchanged to cause the duty ratio to reach the target duty ratio, when the target duty ratio is larger than the standard duty ratio, when the target duty ratio is equal to the standard duty ratio.

10 Claims, 4 Drawing Sheets

(56) References Cited

U.S. PATENT DOCUMENTS

| | | | |
|---|---|---|---|
| 2015/0145417 A1 | 5/2015 | Woelfing et al. | |
| 2016/0088697 A1* | 3/2016 | Yan .................. | H05B 45/14 |
| | | | 315/307 |
| 2016/0113093 A1 | 4/2016 | Valois et al. | |
| 2021/0090512 A1* | 3/2021 | Kim .................. | H05B 45/38 |

FOREIGN PATENT DOCUMENTS

| | | |
|---|---|---|
| CN | 106714371 A | 5/2017 |
| CN | 108990205 A | 12/2018 |
| CN | 211297043 U | 8/2020 |
| CN | 111935873 A | 11/2020 |

\* cited by examiner

METHOD AND SYSTEM FOR DYNAMICALLY ADJUSTING PWM SIGNAL, AND SYSTEM FOR DYNAMICALLY CONTROLLING HIGH-POWER LIGHT

CROSS REFERENCE TO RELATED APPLICATIONS

The present application is a continuation of International Application No. PCT/CN2021/074042, filed on Jan. 28, 2021, which claims priority from Chinese Patent Application No. 202010962852.4 filed on Sep. 14, 2020, all of which are hereby incorporated herein by reference.

TECHNICAL FIELD

The present invention relates to the field of dimming of an illuminating light, and more specifically to a method and a system for dynamically adjusting a PWM signal, and a system for dynamically controlling a high-power light.

BACKGROUND

A dimming process of a high-power LED illuminating light has the characteristic of a large current. In the prior art, a PWM signal is used to control an MOSFET (metal oxide semiconductor field effect transistor) to control the dimming of the LED light. When the PWM signal represents a high level, the MOSFET for driving the LED light is in an on state, and the LED light lights up due to the current flowing. When the PWM signal represents a low level, the MOSFET for driving the LED light is in an off state, and the LED light lights off for no current flowing. Therefore, the LED light is on and off alternately in a constant and rapid manner. One high-level signal and one low-level signal forms a signal period, and a reciprocal of the signal period is a LED refresh rate.

A duty ratio of a high level of the PWM signal in one signal period determines the brightness of the LED light, and the brightness of the LED light is higher as the duty ratio is increased.

The rapid on and off state of the LED light is generally invisible to the naked eyes, but the camera can capture the rapid on and off of the LED light at a certain exposure frequency. When the camera captures the rapid on and off of the LED light, the camera will flicker when shooting. Thus, the source of the flickering of the camera during shooting is the exposure frequency of the camera, and when the brightness of the LED light is high, the camera automatically reduces the exposure time, that is, increases the exposure frequency in order to avoid over-exposure of a photosensitive device of the camera. When the exposure time of the camera is shorter than the signal period of the PWM signal for controlling a light source, the camera has an opportunity to capture a separate on and off state of the LED light, which can cause the camera to flicker during shooting. Therefore, the refresh rate of the LED light should be increased appropriately when the brightness of the LED light is high. However, when the LED light gets brighter, the refresh rate of the LED is increasingly high in order to avoid flickering of the camera during shooting, but a resolution will be not enough to support high-frequency LED refreshing as limited performance of the general system hardware, resulting in that the LED dimming will be not smooth at this time.

SUMMARY

The present invention thus provides a method and a system for dynamically adjusting a PWM signal, and a system for dynamically controlling a high-power light, which are used to simultaneously solve the problems of insufficient LED dimming smoothness and flickering of camera during shooting.

According to the present invention, the method for dynamically adjusting a PWM signal includes the steps of:

presetting a standard signal period of a PWM signal and a standard duty ratio of an effective pulse in the standard signal period;

receiving a target duty ratio entered by a user and comparing the target duty ratio with the standard duty ratio;

when the target duty ratio is smaller than the standard duty ratio, adjusting a duration of a signal period relative to the standard signal period while keeping a duration of the effective pulse in the standard signal period unchanged to cause a duty ratio of the effective pulse to reach the target duty ratio from the standard duty ratio, and generating a corrected PWM signal according to the adjusted duration of the signal period and the target duty ratio;

when the target duty ratio is larger than the standard duty ratio, adjusting the duration of the effective pulse in the standard signal period while keeping the duration of the standard signal period unchanged to cause the duty ratio of the effective pulse to reach the target duty ratio from the standard duty ratio, and generating a corrected PWM signal according to the duration of the standard signal period and the target duty ratio; and when the target duty ratio is equal to the standard duty ratio, generating a corrected PWM signal according to the standard duty ratio and the duration of the standard signal period.

The method according to the present invention is used to adjust the duty ratio of the PWM signal, and the adjusted PWM signal is primarily used to control the on and off of the illuminating light. The duty ratio of the effective pulse of the PWM signal in one signal period, that is, a duration ratio of the effective pulse in one signal period determines the brightness of the illuminating light. The higher the duty ratio of the effective pulse of the PWM signal is, the higher the brightness of the light will be.

As described in the background, the refresh rate of the PWM signal can have an influence on the smoothness of the illuminating light dimming, while also causing the camera operating at the illuminating light to flicker during shooting. In order to solve the two problems simultaneously, the adjustment of the duty ratio of the PWM signal is divided into two adjustment modes in the method provided by the present invention.

Prior to adjusting the duty ratio, the standard signal period of the PWM signal and the standard duty ratio of the effective pulse within the standard signal period are preset, and the standard duty ratio is set as a starting adjustment state of each duty ratio adjustment. After the standard signal period and the standard duty ratio are set, a target duty ratio entered by a user is received, which refers to a duty ratio of an effective pulse in a certain signal period expected by the user, and the target duty ratio is compared with the standard duty ratio, followed by using the two different adjustment modes to perform adjustment according to the comparison result.

The first adjustment mode is as follows. When the target duty ratio is smaller than the standard duty ratio, the duration of the signal period is adjusted relative to the standard signal period while keeping the duration of the effective pulse unchanged. As the signal period changes, the refresh rate of the PWM signal (that is, the reciprocal of the signal period) will also change accordingly. The refresh rate of the PWM signal is proportional to the duty ratio of the effective pulse since the duration of the effective pulse is kept unchanged. The higher the duty ratio of the effective pulse is, the higher the refresh rate of the PWM signal will be. This stage is mainly used in the following case. In the process of adjusting the duty ratio of the effective pulse, the refresh rate of the PWM signal needs to be increased with the increase of the duty ratio of the effective pulse (that is, the brightness of the illuminating light) since it is necessary to prevent the flickering from occurring during the shooting due to an excessively high exposure rate of the camera. After the adjustment is completed, that is, after the duty ratio of the effective pulse reaches the target duty ratio from the standard duty ratio, the duration of the signal period changes during the adjustment process, and thus, a corrected PWM signal is generated with the target duty ratio and the adjusted duration of the signal period.

The second adjustment mode is as follows. When the target duty ratio is larger than the standard duty ratio, the duration of the standard signal period is kept unchanged, so that the refresh rate is kept unchanged. In the second adjustment mode, the refresh rate of the PWM signal is kept unchanged by keeping the signal period unchanged. In the process of keeping the refresh rate of the PWM signal unchanged, the duration of the effective pulse is variable, so that the duty ratio of the effective pulse changes. This adjustment mode is mainly used in the following case. In the process of adjusting the duty ratio of the effective pulse, the refresh rate of the PWM signal is kept unchanged, and the duty ratio is adjusted while keeping the refresh rate of the PWM signal unchanged since it is necessary to prevent unsmooth dimming of the illuminating light from occurring due to the excessively high refresh rate. After the adjustment is completed, that is, after the duty ratio of the effective pulse reaches the target duty ratio from the standard duty ratio, a corrected PWM signal is generated according to the target duty ratio and the duration of the standard signal period.

When the target duty ratio is equal to the standard duty ratio, the duty ratio does not need to be adjusted, and a corrected PWM signal is directly generated according to the standard duty ratio and the duration of the standard signal period.

In the method of the present invention, the adjustment of the duty ratio of the PWM signal is performed by the two adjustment modes. The first adjustment mode can be used to adjust the duty ratio of the PWM signal while making the refresh rate change with the duty ratio, so that the camera is prevented from flickering when shooting under a light source controlled by the PWM signal. The second adjustment mode can be used to adjust the duty ratio of the PWM signal while keeping the refresh rate unchanged, so that the unsmooth dimming of the illuminating light due to the excessively high refresh rate is prevented from occurring. The two adjustment modes can effectively solve the aforementioned two problems at the same time, and the adjustment method is fast and simple, and has a high adjustment efficiency.

In addition, when the target duty ratio is smaller than the standard duty ratio, the duration of the signal period is adjusted relative to the standard signal period while keeping the duration of the effective pulse in the standard signal period unchanged to cause the duty ratio of the effective pulse to reach the target duty ratio from the standard duty ratio, and specifically, when the target duty ratio is smaller than the standard duty ratio, a duration of an invalid pulse in the standard signal period is increased while keeping the duration of the effective pulse in the standard signal period unchanged to increase the duration of the standard signal period, so that the duty ratio of the effective pulse is reduced to cause the duty ratio of the effective pulse to reach the target duty ratio from the standard duty ratio.

When the target duty ratio is smaller than the standard duty ratio, the standard duty ratio is adjusted to reach the target duty ratio. In this adjustment process, the duty ratio of the effective pulse in the standard signal period is required to be reduced. Therefore, the duration of the invalid pulse in the signal period is adjusted while keeping the duration of the effective pulse unchanged, thereby adjusting the duty ratio of the effective pulse. The longer the duration of the invalid pulse is, the lower the duty ratio of the valid pulse will be. The longer the signal period is, the lower the refresh rate of the signal will be. The reduction in the duty ratio of the effective pulse results in a decrease in the brightness of the illuminating light. There is no need to consider the flickering of the camera during shooting when the brightness decreases, so that the refresh rate of the signal can also be reduced accordingly.

In addition, when the target duty ratio is larger than the standard duty ratio, the duration of the effective pulse in the standard signal period is adjusted while keeping the duration of the standard signal period unchanged to cause the duty ratio of the effective pulse to reach the target duty ratio from the standard duty ratio, and specifically, when the target duty ratio is larger than the standard duty ratio, the duration of the effective pulse in the standard signal period is increased and the duration of the invalid pulse in the standard signal period is reduced while keeping the duration of the standard signal period unchanged, so that the duty ratio of the effective pulse is increased to cause the duty ratio of the effective pulse to reach the target duty ratio from the standard duty ratio.

When the target duty ratio is larger than the standard duty ratio, the standard duty ratio is adjusted to reach the target duty ratio. In this adjustment process, the duty ratio of the effective pulse in the standard signal period is required to be increased. Since the signal refresh rate corresponding to the standard signal period is already in a high state, it is impossible to continue to increase the refresh rate while increasing the standard duty ratio. Otherwise, the unsmooth dimming of the illuminating light will occur. To keep the refresh rate unchanged, the duration of the standard signal cycle is required to be kept unchanged. Further, if the duration of the signal period is kept unchanged in a process of adjusting the duty ratio of the effective pulse in one signal period, the duration of the effective pulse and the invalid pulse is required to be adjusted to adjust the duty ratio of the effective pulse. The greater the relative duration of the effective pulse, the higher the duty ratio of the effective pulse, and the higher the brightness of the illuminating light, but the refresh rate remains unchanged. Thus, in the second stage, it is ensured that the refresh rate of the PWM signal is kept at a certain value in the process of increasing the brightness of the illuminating light continuously. The unsmooth dimming of the illuminating light is avoided, and at the same time, the brightness of the illuminating light can be adjusted by adjusting the duty ratio of the effective pulse.

The standard duty ratio is determined by the power of the illuminating light and the exposure frequency of the camera during shooting. The illumination process of the illuminating light is controlled by the generated corrected PWM signal, and the shooting of the camera is performed under the light generated by the illuminating light.

To determine which one of the first adjustment mode and the second adjustment mode to be adopted to adjust the duty ratio, the target duty ratio is required to be compared with the standard duty ratio. The standard duty ratio is determined by the power of the illuminating light and the exposure rate of the camera, and as for the high-power illuminating light, a change in the duty ratio of the effective pulse by one percentage point will have a great impact on the brightness of the illuminating light when the brightness exceeds a certain brightness threshold. At the same time, as described in the background art, when the brightness of the illuminating light is high, the exposure rate of a camera shooting under the light of the illuminating light will be increased. If the refresh rate of the PWM signal for controlling the illuminating light is too low, the flickering during shooting will occur, but the refresh rate cannot be too high, otherwise the dimming will not be smooth. It can be seen that the power of the illuminating light and the exposure rate of the camera are the main factors that affect the adjustment process. Therefore, a preset value is determined according to the power of the illuminating light and the exposure rate of the camera, and the preset ratio value is used as the standard duty ratio.

When the target duty ratio entered by the user does not exceed the standard duty ratio, the duty ratio of the effective pulse in the standard signal period is reduced from the standard duty ratio to the target duty ratio. At the same time, the brightness of the illuminating light is reduced, and the flickering of the camera during shooting due to the exposure rate is less likely to occur. Therefore, the refresh rate of the PWM signal can be reduced with the reduction in the duty ratio of the effective pulse. When the target duty ratio entered by the user exceeds the standard duty ratio, the duty ratio of the effective pulse is increased while keeping the refresh rate of the PWM signal unchanged to increase the brightness of the illuminating light since the refresh rate corresponding to the standard signal cycle has reached a certain level and the dimming of the illuminating light is not smooth if the refresh rate is continued to increase.

A range of the signal period of the generated corrected PWM signal is from 1/600 s to 1/25000 s, that is, the refresh rate of the generated corrected PWM signal is from 600 hz to 25 khz.

The present invention further provides a system for dynamically adjusting a PWM signal, which includes a signal detection module, a constant effective pulse width modulation module and a constant cycle pulse width modulation module and. The signal detection module is configured to preset a standard signal period of a PWM signal and a standard duty ratio of an effective pulse in the standard signal period, receive a target duty ratio entered by a user, and compare the target duty ratio with the standard duty ratio to generate a comparison result. The constant effective pulse width modulation module is configured to adjust a duration of a signal period relative to the standard signal period while keeping a duration of the effective pulse in the standard signal period preset by the signal detection module unchanged to cause a duty ratio of the effective pulse to reach the target duty ratio from the standard duty ratio, and generate a corrected PWM signal according to the adjusted duration of the signal period and the target duty ratio, based on the comparison result, generated by the signal detection module, that the target duty ratio of the effective pulse is smaller than the standard duty ratio. The constant cycle pulse width modulation module is configured to adjust a duration of the effective pulse in the standard signal period while keeping a duration of the standard signal period preset by the signal detection module unchanged to cause the duty ratio of the effective pulse to reach the target duty ratio from the standard duty ratio, and generate a corrected PWM signal according to the duration of the standard signal period and the target duty ratio, based on the comparison result, generated by the signal detection module, that the target duty ratio of the effective pulse is larger than the standard duty ratio. The constant effective pulse width modulation module or the constant cycle pulse width modulation module is further configured to generate a corrected PWM signal according to the standard duty ratio and the duration of the standard signal period, based on the comparison result that the target duty ratio of the effective pulse is equal to the standard duty ratio.

As described in the background, the refresh rate of the PWM signal can have an influence on the smoothness of the illuminating light dimming, while also causing the camera operating at the illuminating light to flicker during shooting. In order to solve the two problems simultaneously, the adjustment of the duty ratio of the PWM signal is divided into two adjustment modes in the system provided by the present invention, which are respectively executed by different modules.

Prior to adjusting the duty ratio, the standard signal period of the PWM signal and the standard duty ratio of the effective pulse within the standard signal period are preset in the signal detection module, and the standard duty ratio is set as a starting adjustment state of each duty ratio adjustment. After the standard signal period and the standard duty ratio are set, the signal detection module receives a target duty ratio entered by a user, which refers to a duty ratio of an effective pulse in a certain signal period expected by the user, and compares the target duty ratio with the standard duty ratio after receiving them. According to the result of the comparison, the two modules are called to adjust the duty ratio of the effective pulse in different adjustment modes.

When the comparison result in the signal detection module is that the target duty ratio is smaller than the standard duty ratio, the constant effective pulse width modulation module is called to adjust the duty ratio of the effective pulse. The adjustment method thereof is as follows. When the target duty ratio is smaller than the standard duty ratio, the duration of the signal period is adjusted relative to the standard signal period while keeping the duration of the effective pulse unchanged. As the signal period changes, the refresh rate of the PWM signal (that is, the reciprocal of the signal period) will also change accordingly. The refresh rate of the PWM signal is proportional to the duty ratio of the effective pulse since the duration of the effective pulse is kept unchanged. The higher the duty ratio of the effective pulse is, the higher the refresh rate of the PWM signal will be. This stage is mainly used in the following case. In the process of adjusting the duty ratio of the effective pulse, the refresh rate of the PWM signal needs to be increased with the increase of the duty ratio of the effective pulse (that is, the brightness of the illuminating light) since it is necessary to prevent the flickering from occurring during the shooting due to an excessively high exposure rate of the camera. After the adjustment is completed, that is, after the duty ratio of the effective pulse reaches the target duty ratio from the standard duty ratio, the duration of the signal period changes during the adjustment process, and thus, the constant effective pulse width modulation module generates a corrected PWM signal with the target duty ratio and the adjusted duration of the signal period.

When the comparison result in the signal detection module is that the target duty ratio is larger than the standard duty ratio, the constant cycle pulse width modulation module is called to adjust the duty ratio of the effective pulse. The adjustment method thereof is as follows. The duration of the standard signal period is kept unchanged, so that the refresh rate is kept unchanged. In the second adjustment mode, the refresh rate of the PWM signal is kept unchanged by keeping the signal period unchanged. In the process of keeping the refresh rate of the PWM signal unchanged, the duration of the effective pulse is variable, so that the duty ratio of the effective pulse changes. This adjustment mode is mainly used in the following case. In the process of adjusting the duty ratio of the effective pulse, the refresh rate of the PWM signal is kept unchanged, and the duty ratio is adjusted while keeping the refresh rate of the PWM signal unchanged since it is necessary to prevent unsmooth dimming of the illuminating light from occurring due to the excessively high refresh rate. After the adjustment is completed, that is, after the duty ratio of the effective pulse reaches the target duty ratio from the standard duty ratio, the constant cycle pulse width modulation module generates a corrected PWM signal according to the target duty ratio and the duration of the standard signal period.

When the comparison result in the signal detection module is that the target duty ratio is equal to the standard duty ratio, the constant cycle pulse width modulation module or the constant effective pulse width modulation module directly generates the corrected PWM signal according to the standard duty ratio and the duration of the standard signal period.

The constant effective pulse width modulation module can be further configured to adjust the duration of the signal period relative to the standard signal period while keeping the duration of the effective pulse in the standard signal period preset by the signal detection module unchanged to cause the duty ratio of the effective pulse to reach the target duty ratio from the standard duty ratio. Specifically, the constant effective pulse width modulation module is configured to increase the duration of an invalid pulse in the standard signal period while keeping the duration of the effective pulse in the standard signal period preset by the signal detection module unchanged to increase the duration of the standard signal period, thereby reducing the duty ratio of the effective pulse to cause the duty ratio of the effective pulse to reach the target duty ratio from the standard duty ratio.

When the target duty ratio is smaller than the standard duty ratio, the constant effective pulse width modulation module is called to adjust the duty ratio of the effective pulse to reach the target duty ratio. In this adjustment process, the duty ratio of the effective pulse is required to be reduced. Therefore, the duration of the invalid pulse in the signal period is adjusted while keeping the duration of the effective pulse unchanged, thereby adjusting the duty ratio of the effective pulse. The longer the duration of the invalid pulse is, the lower the duty ratio of the valid pulse will be. The longer the signal period, the lower the refresh rate of the signal. The reduction in the duty ratio of the effective pulse results in a decrease in the brightness of the illuminating light. There is no need to consider the flickering of the camera during shooting when the brightness decreases, so that the refresh rate of the signal can also be reduced accordingly.

The constant cycle pulse width modulation module can be further configured to adjust the duration of the effective pulse in the standard signal period while keeping the duration of the standard signal period preset by the signal detection module unchanged to cause the duty ratio of the effective pulse to reach the target duty ratio from the standard duty ratio. Specifically, the constant cycle pulse width modulation module is configured to increase the duration of the effective pulse in the standard signal period and reduce a duration of an invalid pulse in the standard signal period while keeping the duration of the standard signal period preset by the signal detection module unchanged, thereby increasing the duty ratio of the effective pulse to cause the duty ratio of the effective pulse to reach the target duty ratio from the standard duty ratio.

When the target duty ratio is larger than the standard duty ratio, the constant cycle pulse width modulation module is called to adjust the duty ratio of the effective pulse to reach the target duty ratio. In this adjustment process, the duty ratio of the effective pulse is required to be increased. Since the signal refresh rate corresponding to the standard signal period is already in a high state, it is impossible to continue to increase the refresh rate while increasing the duty ratio of the effective pulse. Otherwise, the unsmooth dimming of the illuminating light will occur. To keep the refresh rate unchanged, the duration of the standard signal cycle is required to be kept unchanged. Further, if the duration of the signal period is kept unchanged in a process of adjusting the duty ratio of the effective pulse in one signal period, the duration of the effective pulse and the invalid pulse is required to be adjusted to adjust the duty ratio of the effective pulse. The greater the relative duration of the effective pulse, the higher the duty ratio of the effective pulse, and the higher the brightness of the illuminating light, but the refresh rate remains unchanged. Thus, in the second stage, it is ensured that the refresh rate of the PWM signal is kept at a certain value in the process of increasing the brightness of the illuminating light continuously. The unsmooth dimming of the illuminating light is avoided, and at the same time, the brightness of the illuminating light can be adjusted by adjusting the duty ratio of the effective pulse.

The present invention further provides a system for dynamically controlling a high-power light, which includes a transistor, a illuminating light electrically connected to the transistor, and the above-described system for dynamically adjusting the PWM signal. Both the constant effective pulse width modulation module and the constant cycle pulse width modulation module are electrically connected to the transistor and output the generated corrected PWM signal to the transistor. The transistor is configured to control the on and off of a drive current according to the PWM signal output by the constant effective pulse width modulation module or the constant period pulse width modulation module, thereby controlling the brightness of the illuminating light.

A power range of the illuminating light is from 600 w to 5000 w. The system for controlling a high-power illuminating light, which is provided by the present invention is mainly applied to a high-power illuminating light with a power of 600 w to 5000 w. The dimming process of the high-power illuminating light has the characteristic of a large current, so that the PWM signal is adopted to control the transistor for driving the illuminating light. Therefore, the system provided by the present invention is mainly applied to the on-off control of high-power illuminating light, in which the brightness of the high-power illuminating light is specifically controlled by the refresh rate and the duration ratio of the effective pulse.

Compared with the prior art, some beneficial effects of the present invention can be obtained.

The duty ratio of the PWM signal is processed separately by two adjustment modes or by two modules in different adjustment modes. The first adjustment mode/one of the modules (constant effective pulse width modulation module) is mainly used to adjust the duty ratio of the effective pulse of the signal while preventing the camera from flickering during shooting. The second adjustment mode/the other module (constant cycle pulse width modulation module) is mainly used to adjust the duty ratio of the effective pulse of the signal while preventing the dimming of the illuminating light from being unsmooth due to the excessively high refresh rate. The two-stage adjustment can effectively prevent the occurrence of the aforementioned two problems, and the adjustment method is fast and simple, and has a high adjustment efficiency.

DETAILED DESCRIPTION OF THE EMBODIMENT

Figure 1:
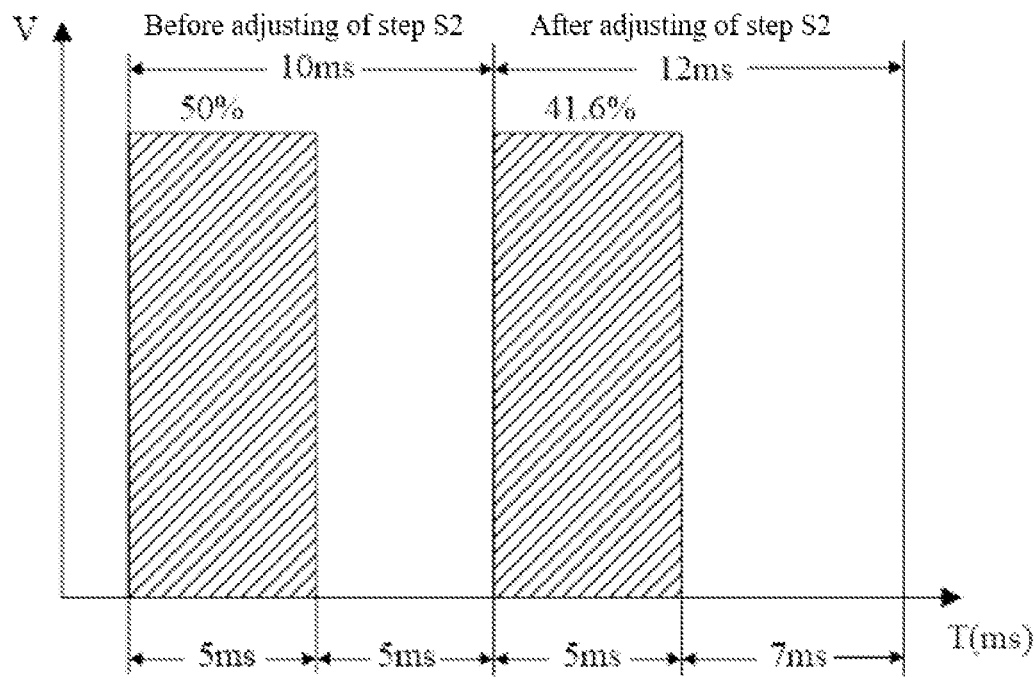
FIG. 1 is a schematic diagram of a change of a duty ratio of an effective pulse in an adjustment process of step S2 according to an embodiment.

The drawings are for illustrative purposes only and are not to be construed as limiting the present invention. For better illustrating the following embodiments, some parts in the drawings may be omitted, enlarged, or reduced, and sizes of these parts do not represent that of actual products. For those skilled in the art, it will be understood that some known structures and descriptions thereof in the drawings may be omitted.

According to an embodiment, a method for dynamically adjusting a PWM signal is provided, the method includes the steps of:

S1: presetting a standard signal period of a PWM signal and a standard duty ratio of an effective pulse in the standard signal period;

receiving a target duty ratio entered by a user and comparing the target duty ratio with the standard duty ratio;

if the target duty ratio is smaller than the standard duty ratio, proceeding to step S2; if the target duty ratio is larger than the standard duty ratio, proceeding to step S3; if the target duty ratio is equal to the standard duty ratio, proceeding to step S4;

repeating the previous comparison and performing the corresponding steps according to the comparison result when receiving a target duty ratio entered by the user again;

S2: adjusting a duration of a signal period relative to the standard signal period while keeping a duration of the effective pulse in the standard signal period unchanged to cause a duty ratio of the effective pulse to reach the target duty ratio from the standard duty ratio, and generating a corrected PWM signal according to the adjusted duration of the signal period and the target duty ratio;

S3: adjusting the duration of the effective pulse in the standard signal period while keeping the duration of the standard signal period unchanged to cause the duty ratio of the effective pulse to reach the target duty ratio from the standard duty ratio, and generating a corrected PWM signal according to the duration of the standard signal period and the target duty ratio; and S4: generating a corrected PWM signal according to the standard duty ratio and the duration of the standard signal period.

The method for dynamically adjusting the PWM signal according to the present invention can be specifically applied to any module, equipment or device applicable to this method. The method according to the present embodiment is used to adjust the PWM signal, and the adjusted PWM signal is mainly used for controlling the on and off of a illuminating light. The illuminating light may be an LED illuminating light or any illuminating light suitable for being adjusted by a PWM signal.

The duty ratio of the effective pulse of the PWM signal in one signal period, that is, a duration ratio of the effective pulse in one signal period determines the brightness of the illuminating light. The higher the duration ratio of the effective pulse of the PWM signal, the higher the brightness of the light.

Driven by the PWM signal, the illuminating light is in a rapid on and off state, which is invisible to the naked eyes. However, if a camera shoots under the light of the illuminating light, the camera can capture the rapid on and off of the illuminating light at a certain exposure frequency. When the camera captures the rapid on and off of the illuminating light, the camera will flicker when shooting. When the brightness of the illuminating light is high, the camera is required to reduce the exposure time, that is, increase the exposure frequency in order to avoid over-exposure of a photosensitive device of the camera. When the exposure time of the camera is shorter than the signal period of the PWM signal for controlling a light source, the camera has an opportunity to capture a separate on and off state of the illuminating light, which can cause the camera to flicker during shooting. Therefore, the refresh rate of the illuminating light should be increased appropriately when the brightness of the illuminating light is high. However, when the lighting refresh rate is too high, the problem of the unsmooth dimming of the illuminating light will occur although the problem of the flickering of the camera during shooting is solved. The method according to the present embodiment can solve the aforementioned problem caused by the refresh rate while adjusting the PWM signal.

In this embodiment, the adjustment process of the PWM signal in this method is divided into two adjustment modes, which are processed separately by step S2 and step S3. Before adjusting the duty ratio, the standard signal period of the PWM signal and the standard duty ratio of the effective pulse in the standard signal period are preset firstly in step S1. The duration of the standard signal period may be from $\frac{1}{16000}$ s to $\frac{1}{25000}$ s, and may preferably be set to $\frac{1}{20000}$ s. The standard duty ratio is set as a starting adjustment state of each duty ratio adjustment. After the standard signal period and the standard duty ratio are set, a target duty ratio entered by a user or entered externally is received, which refers to a duty ratio of an effective pulse in a certain signal period expected by the user, and the target duty ratio is compared with the standard duty ratio, followed by selecting and using the two different adjustment modes to perform adjustment according to the comparison result.

The step S2 is the first adjustment mode, which is executed when the target duty ratio is smaller than the standard duty ratio according to the comparison result of step S1. In step S2, the duration of the signal period is adjusted relative to the standard signal period while keeping the duration of the effective pulse unchanged. As the signal period changes, the refresh rate of the PWM signal (that is, the reciprocal of the signal period) will also change accordingly. The refresh rate of the PWM signal thus is changed with the duty ratio of the effective pulse since the duration of the effective pulse is kept unchanged. And the higher the duty ratio of the effective pulse is, the higher the refresh rate of the PWM signal will be.

This stage is mainly used when the brightness of the illuminating light is low (that is, the duty ratio of the effective pulse and the refresh rate of the PWM signal are low). In the process of continuously improving the brightness of the illuminating light, it is required to prevent the flickering of the camera from occurring during the shooting process, and therefore, the refresh rate of the PWM signal will also increase as the brightness of the illuminating light increases. After the adjustment is completed, that is, when the standard duty ratio reaches the target duty ratio, the duration of the signal period changes during the adjustment process, the corrected PWM signal is thus generated with the target duty ratio and the adjusted duration of the signal period.

The step S3 is the second adjustment mode, which is executed when the target duty ratio is larger than the standard duty ratio according to the comparison result of step S1. In step S3, the duration of the standard signal period is kept unchanged to make the refresh rate keep unchanged. In the second adjustment mode, the refresh rate of the PWM signal is kept unchanged by keeping the signal period unchanged. In the process of keeping the refresh rate of the PWM signal unchanged, the duration of the effective pulse is variable, so that the duty ratio of the effective pulse changes. This adjustment mode is mainly used when the brightness of the illuminating light is high (that is, the duty ratio of the effective pulse is relatively high). When the refresh rate of the PWM signal reaches a certain level (the reciprocal of the standard signal period), it is required to prevent the unsmooth dimming of the illuminating light, and therefore, the refresh rate of the PWM signal is required to be unchanged. While keeping the refresh rate of the PWM signal unchanged, the brightness of the illuminating light can still be adjusted by adjusting the duty ratio. After the adjustment is completed, that is, after the duty ratio of the effective pulse reaches the target duty ratio from the standard duty ratio, a corrected PWM signal is generated according to the target duty ratio and the duration of the standard signal period.

The step S4 is executed when the target duty ratio is equal to the standard duty ratio according to the comparison result of step S1. At this time, the duty ratio is not required to be adjusted, and the corrected PWM signal is directly generated according to the standard duty ratio and the duration of the standard signal period.

In the method according to the present embodiment, the adjustment of the duty ratio of the PWM signal is performed by the two adjustment modes. The first adjustment mode can be used to adjust the duty ratio of the PWM signal while making the refresh rate change with the duty ratio, so that the camera is prevented from flickering when shooting under a light source controlled by the PWM signal. The second adjustment mode can be used to adjust the duty ratio of the PWM signal while keeping the refresh rate unchanged, so that the unsmooth dimming of the illuminating light due to the excessively high refresh rate is prevented from occurring. The two adjustment modes can effectively solve the aforementioned two problems at the same time, and the adjustment method is fast and simple, and has a high adjustment efficiency.

According to some embodiments, the specific execution process of step S2 is as follows.

A duration of an invalid pulse in the standard signal period is increased while keeping the duration of the effective pulse in the standard signal period unchanged to increase the duration of the standard signal period, so that the duty ratio of the effective pulse is reduced to cause the duty ratio of the effective pulse to reach the target duty ratio from the standard duty ratio.

As shown in FIG. 1, assuming that a standard signal period is 10 ms (that is, the duration is 10 ms) and a standard duty ratio of an effective pulse is 50%, a duration of the effective pulse in the standard signal period is 5 ms, a duration of an invalid pulse is 5 ms, and a refresh rate of a PWM signal is 100 hz before step S2. When the duty ratio of the effective pulse is required to be reduced (that is, the target duty ratio is smaller than the standard duty ratio), step S2 is executed as follows. Assuming that a target duty ratio is 41.6%, the duration of the invalid pulse is increased to 7 ms while keeping the duration of the effective pulse in the standard signal period unchanged at 5 ms, so that the duration of the signal period is increased to 12 ms, a duration ratio of the effective pulse is reduced to about 41.6%, and the refresh rate of the PWM signal is reduced to about 83 hz. That is, in step S2, the duty ratio of the effective pulse is lower as the duration of the invalid pulse is increased, and as a result, the refresh rate of the PWM signal is lower, and the brightness of the illuminating light controlled by the PWM signal is lower accordingly. The foregoing is only used as an example to illustrate the adjustment process, and the values therein do not limit the adjustment method according to the present embodiment.

Figure 2:
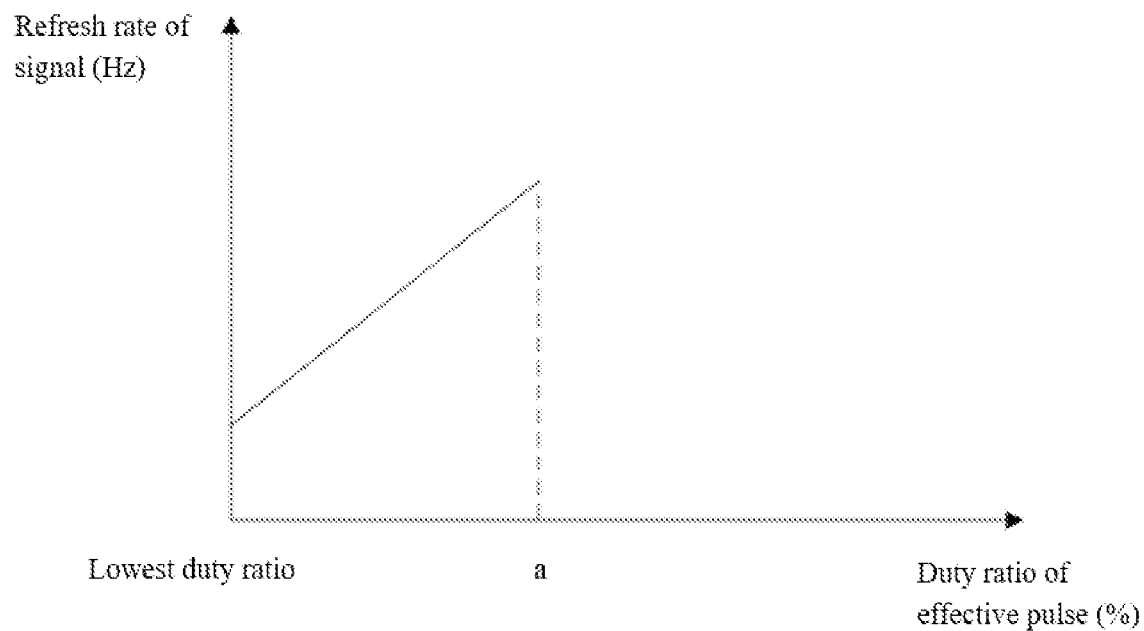
FIG. 2 is a schematic diagram of a relationship between the duty ratio of the effective pulse and a refresh rate in the adjustment process of step S2 according to an embodiment.

As shown in FIG. 2, when the target duty ratio is smaller than the standard duty ratio (the value corresponding to a point of a on the abscissa in FIG. 2), a refresh rate of a signal on the ordinate is proportional to a duty ratio of an effective pulse on the abscissa. When the brightness/duty ratio increases, the refresh rate also increases. Accordingly, the camera is effectively prevented from flickering during shooting due to excessively low refresh rate. When the brightness/duty ratio is reduced, the refresh rate of the signal can be appropriately reduced, and the power consumption of the illuminating light can be reduced. Specifically, the lowest duty ratio among the duty ratios of the effective pulse may be 1/255 or 1/65535.

According to some embodiments, the specific execution process of step S3 is as follows.

The duration of the effective pulse in the standard signal period is increased and the duration of the invalid pulse in the standard signal period is reduced while keeping the duration of the standard signal period unchanged, so that the duty ratio of the effective pulse is increased to cause the duty ratio of the effective pulse to reach the target duty ratio from the standard duty ratio.

Figure 3:
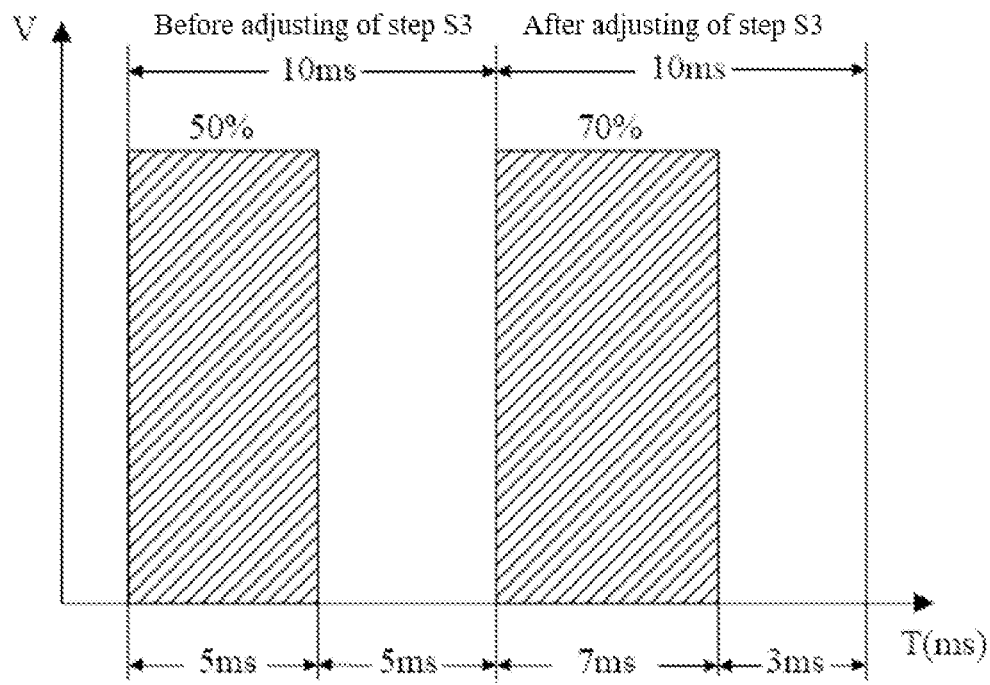
FIG. 3 is a schematic diagram of a change of a duty ratio of an effective pulse in an adjustment process of step S3 according to an embodiment.

As shown in FIG. 3, assuming that a standard signal period is 10 ms (that is, the duration is 10 ms) and a standard duty ratio of an effective pulse is 50%, a duration of the effective pulse in the standard signal period is 5 ms, a duration of an invalid pulse is 5 ms, and a refresh rate of a PWM signal is 100 hz before step S3. When the duty ratio of the effective pulse is required to be increased (that is, the target duty ratio is larger than the standard duty ratio), step S3 is executed as follows. Assuming that the target duty ratio is 70%, the duration of the effective pulse is increased to 7 ms, the duration of the invalid pulse is reduced to 3 ms, and the duration of the signal period is unchanged at 10 ms, so that the width ratio of the effective pulse is increased to 70%, and the refresh rate of the PWM signal is unchanged at 100 hz. That is, in step S3, the duty ratio of the effective pulse is increased by adjusting the width of the effective pulse and the invalid pulse at the same time. Although the refresh rate of the PWM signal is kept unchanged, the brightness of the illuminating light controlled by the PWM signal becomes higher because the duration of the effective pulse increases. In the process of adjusting the width ratio of the effective pulse (the brightness of the illuminating light), the refresh rate of the PWM signal is kept unchanged, which effectively prevents the dimming of the illuminating light from being unsmooth due to the excessively high refresh rate. The foregoing is only used as an example to illustrate the adjustment process, and the values therein do not limit the adjustment method provided by the present embodiment.

Figure 4:
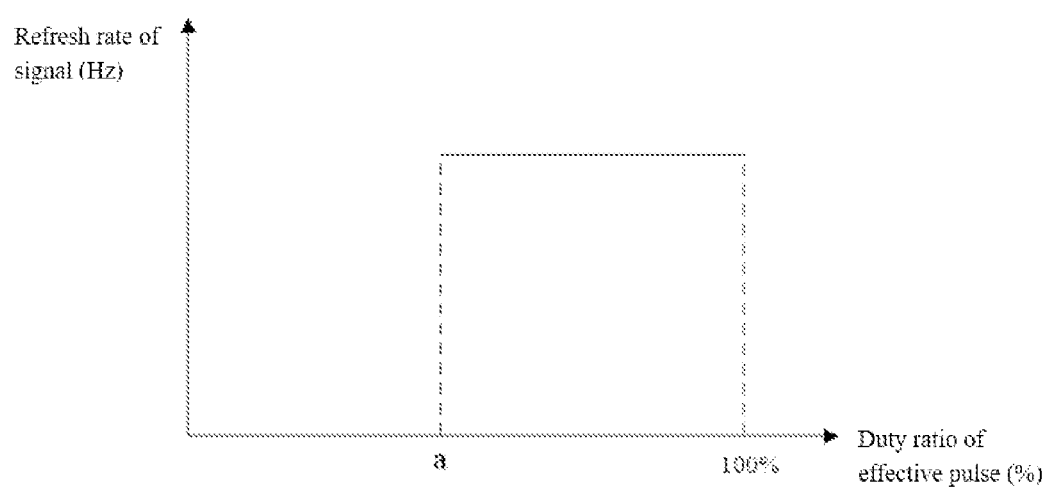
FIG. 4 is a schematic diagram of a relationship between the duty ratio of the effective pulse and a refresh rate in the adjustment process of step S3 according to an embodiment.

As shown in FIG. 4, when the target duty ratio is larger than the standard duty ratio (the value corresponding to a point a on the abscissa in FIG. 4), the refresh rate on the ordinate does not change with the duty ratio of the effective pulse on the abscissa. When the brightness/duty ratio is increased, the refresh rate is kept unchanged, which effectively prevents the dimming of the illuminating light from being unsmooth due to the excessively high refresh rate.

The reason why the refresh rate of the PWM signal is required to be kept unchanged in step S3 is as follows.

(1) Keeping the refresh rate of the PWM signal unchanged can prevent unsmooth dimming of the illuminating light when the refresh rate increases with the increase of the duty ratio.

(2) Since the execution condition of step S3 is that the target duty ratio is larger than the standard duty ratio, the brightness of the illuminating light is high when the duty ratio of the effective pulse reaches the target duty ratio. If the refresh rate is reduced while increasing the duty ratio by other means, such as increasing the duty ratio by only increasing the duration of the effective pulse, the refresh rate will be inversely proportional to the change in the duty ratio. In a case where the brightness of the illuminating light is high, the camera flickers during shooting if the refresh rate is reduced.

It can be seen from (2) that the refresh rate of the PWM signal is required to be kept at a high state in step S3, but it can be seen from (1) that the refresh rate cannot be too high. Therefore, the refresh rate can only be kept consistent with a refresh rate corresponding to a standard time period in step S3, which can prevent the flickering during shooting caused by excessively high exposure rate of the camera and excessively low refresh rate, and can prevent unsmooth dimming of the illuminating light.

Figure 5:
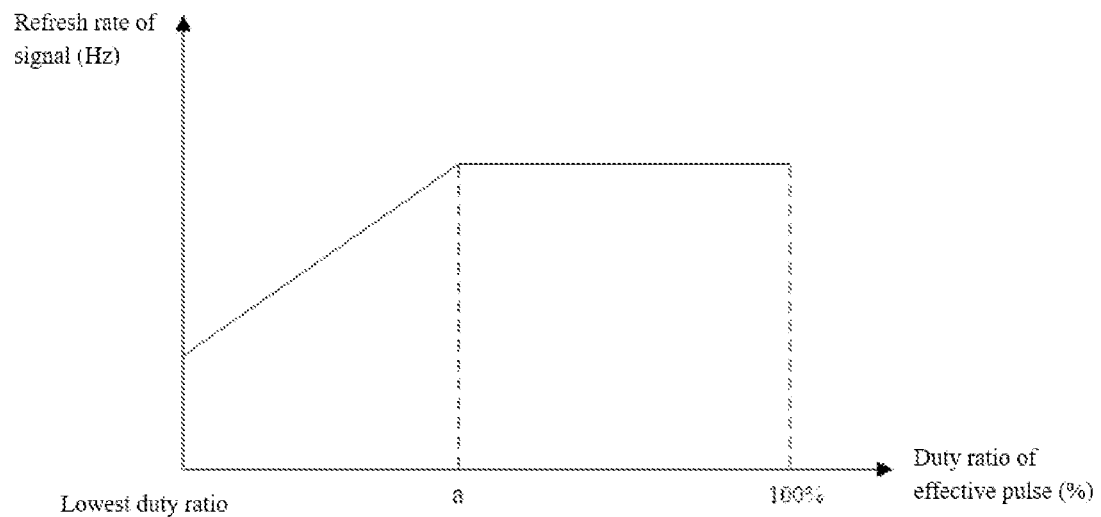
FIG. 5 is a schematic diagram of an overall relationship between the duty ratio of the effective pulse and the refresh rate according to an embodiment.

In summary, as shown in FIG. 5, with the standard duty ratio (the value corresponding to a point a on the abscissa in FIG. 5) as a threshold, when the target duty ratio entered by the user is smaller than the standard duty ratio, the duty ratio of the effective pulse is directly proportional to the refresh rate of the PWM signal, and the duration of the signal period is inversely proportional to the duty ratio of the effective pulse in the process of adjusting the duty ratio. When the target duty ratio entered by the user is larger than the standard duty ratio, the refresh rate of the PWM signal and the duration of the signal period are not affected by the duty ratio of the effective pulse and are kept unchanged in the process of adjusting the duty ratio.

Specifically, the standard duty ratio relates to the power of the illuminating light and the exposure rate of the camera.

Specifically, for high-power illuminating lights, the signal period of the corrected PWM signal generated in the above steps is from $\frac{1}{600}$ s to $\frac{1}{25000}$ s, that is, the adjustment range of the refresh rate of the PWM signal is from 600 hz to 25 khz.

Figure 6:
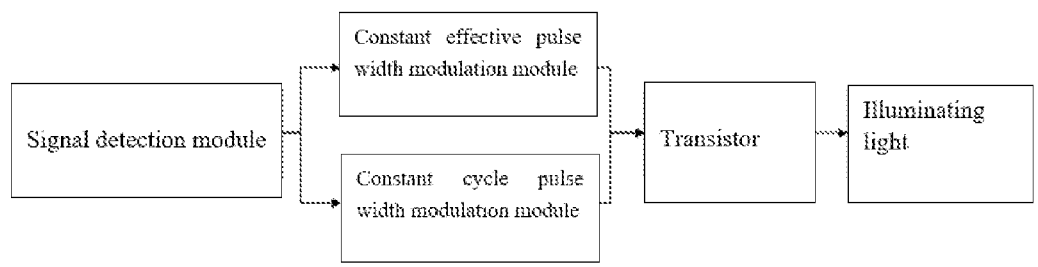
FIG. 6 is a schematic diagram of a structure of a system for dynamically controlling a high-power light according to an embodiment.
Figure 7:
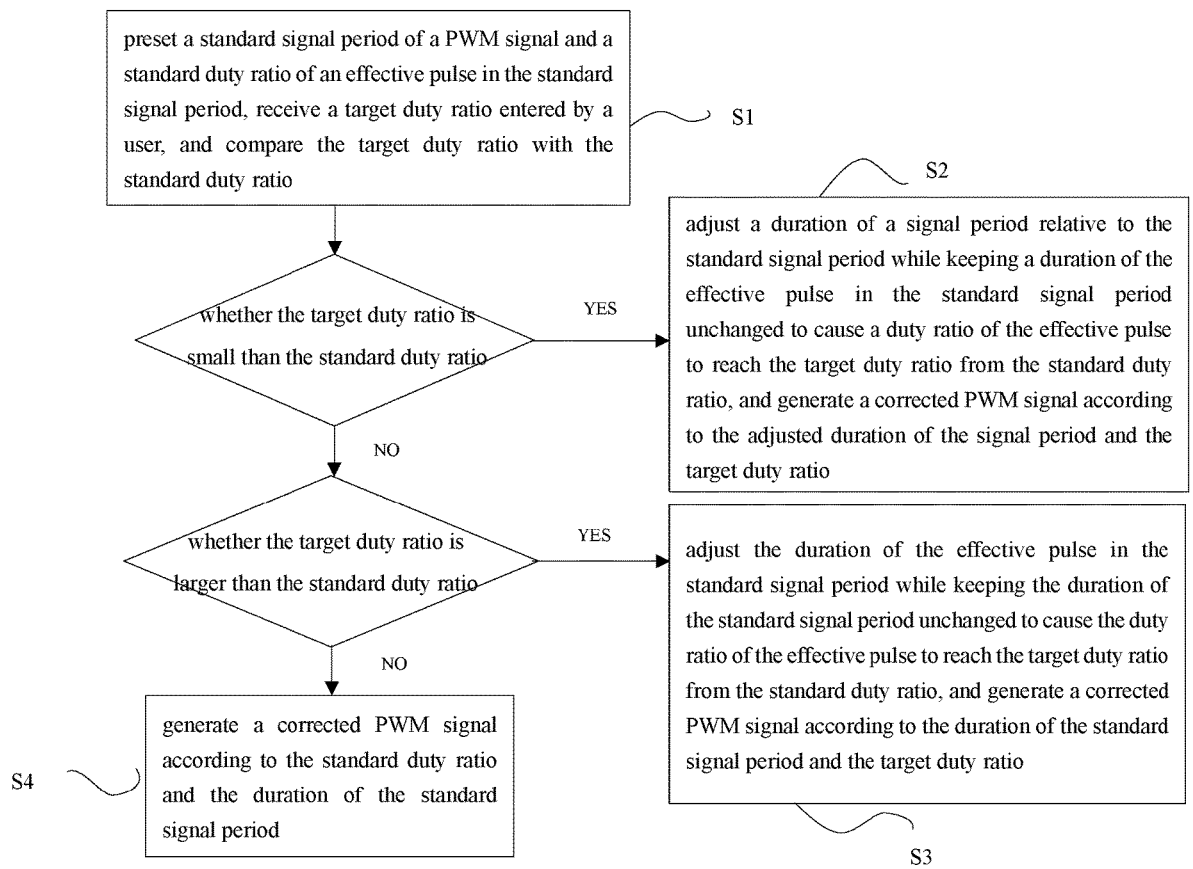
FIG. 7 is a flow chart showing steps S1-S4 according to an embodiment.

As shown in FIG. 6, the present embodiment provides a system for dynamically controlling a high-power light, the system includes a signal detection module, a constant effective pulse width modulation module connected to the signal detection module, a constant cycle pulse width modulation module connected to the signal detection module, a transistor connected to the constant effective pulse width modulation module and the constant cycle pulse width modulation module, and an illuminating light connected to the transistor.

The signal detection module is used to execute step S1 in the method as mentioned above, the constant effective pulse width modulation module is used to execute step S2 in the method as mentioned above, and the constant cycle pulse width modulation module is used to execute step S3 in the method as mentioned above. The specific execution process is as follows.

The signal detection module executes step S1: presetting a standard signal period of a PWM signal and a standard duty ratio of an effective pulse in the standard signal period; and receiving the target duty ratio entered by the user and comparing the target duty ratio with the standard duty ratio.

If the target duty ratio is smaller than the standard duty ratio, the constant effective pulse width modulation module is called to execute step S2; if the target duty ratio is larger than the standard duty ratio, the constant cycle pulse width modulation module is called to execute step S3; if the target duty ratio is equal to the standard duty ratio, the constant effective pulse width modulation module or the constant cycle pulse width modulation module is called to execute step S4; and when the target duty ratio entered by the user is received again, the aforementioned comparison is repeated and the corresponding steps are executed according to the comparison result.

The constant effective pulse width modulation module executes step S2. After executing step S2, the generated corrected PWM signal is output to the transistor, and the transistor controls the on and off of a driving current of the illuminating light according to the PWM signal output by the constant effective pulse width modulation module, thereby controlling the brightness of the illuminating light.

Similarly, the constant cycle pulse width modulation module executes step S3. After executing step S3, the generated corrected PWM signal is output to the transistor, and the transistor controls the on and off of the driving current of the illuminating light according to the PWM signal output by the constant cycle pulse width modulation module, thereby controlling the brightness of the illuminating light.

Similarly, the constant effective pulse width modulation module or the constant period pulse width modulation module executes step S4, and outputs the generated corrected PWM signal to the transistor, thereby controlling the brightness of the illuminating light.

Specifically, the system for dynamically controlling the illuminating light provided by the present embodiment is suitable for the brightness adjustment of the high-power illuminating light, and the power range of the high-power illuminating light is from 600 w to 5000 w.

Obviously, the above embodiments of the present invention are merely examples for clear illustration of the technical solutions of the present invention, and are not intended to limit the implementation of the present invention. Any modification, equivalent substitution, improvement or the like within the spirit and principle of claims of the present invention should be included in the scope of the claims of the present invention.

The invention claimed is:

1. A method for dynamically adjusting a PWM signal, the method comprising steps of:
presetting a standard signal period of a PWM signal and a standard duty ratio of an effective pulse, by a signal detection module, in the standard signal period;
receiving a target duty ratio entered by a user and comparing the target duty ratio with the standard duty ratio;
when the target duty ratio is smaller than the standard duty ratio, adjusting a duration of a signal period relative to the standard signal period, by a constant effective pulse width modulation module, while keeping a duration of the effective pulse in the standard signal period unchanged to cause a duty ratio of the effective pulse to reach the target duty ratio from the standard duty ratio, and generating a corrected PWM signal according to the adjusted duration of the signal period and the target duty ratio;
when the target duty ratio is larger than the standard duty ratio, adjusting the duration of the effective pulse in the standard signal period, by a constant cycle pulse width modulation module, while keeping the duration of the standard signal period unchanged to cause the duty ratio of the effective pulse to reach the target duty ratio from the standard duty ratio, and generating a corrected PWM signal according to the duration of the standard signal period and the target duty ratio; and
when the target duty ratio is equal to the standard duty ratio, generating a corrected PWM signal, by the constant effective pulse width modulation module or the constant cycle pulse width modulation module, according to the standard duty ratio and the duration of the standard signal period.

2. The method for dynamically adjusting the PWM signal according to claim 1, wherein when the target duty ratio is smaller than the standard duty ratio, a duration of an invalid pulse in the standard signal period is increased while keeping the duration of the effective pulse in the standard signal period unchanged to increase the duration of the standard signal period, so that the duty ratio of the effective pulse is reduced to cause the duty ratio of the effective pulse to reach the target duty ratio from the standard duty ratio.

3. The method for dynamically adjusting the PWM signal according to claim 1, wherein when the target duty ratio is larger than the standard duty ratio, the duration of the effective pulse in the standard signal period is increased and the duration of the invalid pulse in the standard signal period is reduced while keeping the duration of the standard signal period unchanged, so that the duty ratio of the effective pulse is increased to cause the duty ratio of the effective pulse to reach the target duty ratio from the standard duty ratio.

4. The method for dynamically adjusting the PWM signal according to claim 1, wherein
the standard duty ratio is determined by a power of an illuminating light and an exposure frequency during a shooting of a camera; and
an illumination process of the illuminating light is controlled by the generated corrected PWM signal, and the shooting of the camera is performed under lighting generated by the illuminating light.

5. The method for dynamically adjusting the PWM signal according to claim 1, wherein a signal period of the generated corrected PWM signal ranges from $1/600$ s to $1/25000$ s.

6. A system for dynamically adjusting a PWM signal, comprising:
a signal detection module, which is configured to preset a standard signal period of a PWM signal and a standard duty ratio of an effective pulse in the standard signal period, receive a target duty ratio entered by a user, and compare the target duty ratio with the standard duty ratio to generate a comparison result;
a constant effective pulse width modulation module, which is configured to adjust a duration of a signal period relative to the standard signal period while keeping a duration of the effective pulse in the standard signal period preset by the signal detection module unchanged to cause a duty ratio of the effective pulse to reach the target duty ratio from the standard duty ratio, and generate a corrected PWM signal according to the adjusted duration of the signal period and the target duty ratio, wherein the target duty ratio of the effective pulse is smaller than the standard duty ratio based on the comparison result generated by the signal detection module; and
a constant cycle pulse width modulation module, which is configured to adjust a duration of the effective pulse in the standard signal period while keeping a duration of the standard signal period preset by the signal detection module unchanged to cause the duty ratio of the effective pulse to reach the target duty ratio from the standard duty ratio, and generate a corrected PWM signal according to the duration of the standard signal period and the target duty ratio, wherein the target duty ratio of the effective pulse is larger than the standard duty ratio based on the comparison result generated by the signal detection module,
wherein the constant effective pulse width modulation module or the constant cycle pulse width modulation module is further configured to generate a corrected PWM signal according to the standard duty ratio and the duration of the standard signal period, wherein the target duty ratio of the effective pulse is equal to the standard duty ratio based on the comparison result generated by the signal detection module.

7. The system for dynamically adjusting the PWM signal according to claim 6, wherein the constant effective pulse width modulation module is configured to increase the duration of an invalid pulse in the standard signal period while keeping the duration of the effective pulse in the standard signal period preset by the signal detection module unchanged to increase the duration of the standard signal period, thereby reducing the duty ratio of the effective pulse to cause the duty ratio of the effective pulse to reach the target duty ratio from the standard duty ratio.

8. The system for dynamically adjusting the PWM signal according to claim 6, wherein the constant cycle pulse width modulation module is configured to increase the duration of the effective pulse in the standard signal period and reduce a duration of an invalid pulse in the standard signal period while keeping the duration of the standard signal period preset by the signal detection module unchanged, thereby increasing the duty ratio of the effective pulse to cause the duty ratio of the effective pulse to reach the target duty ratio from the standard duty ratio.

9. A system for dynamically controlling a high-power light, comprising
a transistor;
an illuminating light electrically connected to the transistor; and
the system for dynamically adjusting the PWM signal according to claim 6,
wherein both the constant effective pulse width modulation module and the constant cycle pulse width modulation module are electrically connected to the transistor and output the generated corrected PWM signal to the transistor, and
the transistor is configured to control the on and off of a drive current according to the PWM signal output by the constant effective pulse width modulation module or the constant period pulse width modulation module, thereby controlling the brightness of the illuminating light.

10. The system for dynamically controlling the high-power light according to claim 9, wherein a power of the illuminating light ranges from 600 w to 5000 w.

* * * * *